Figure 1:
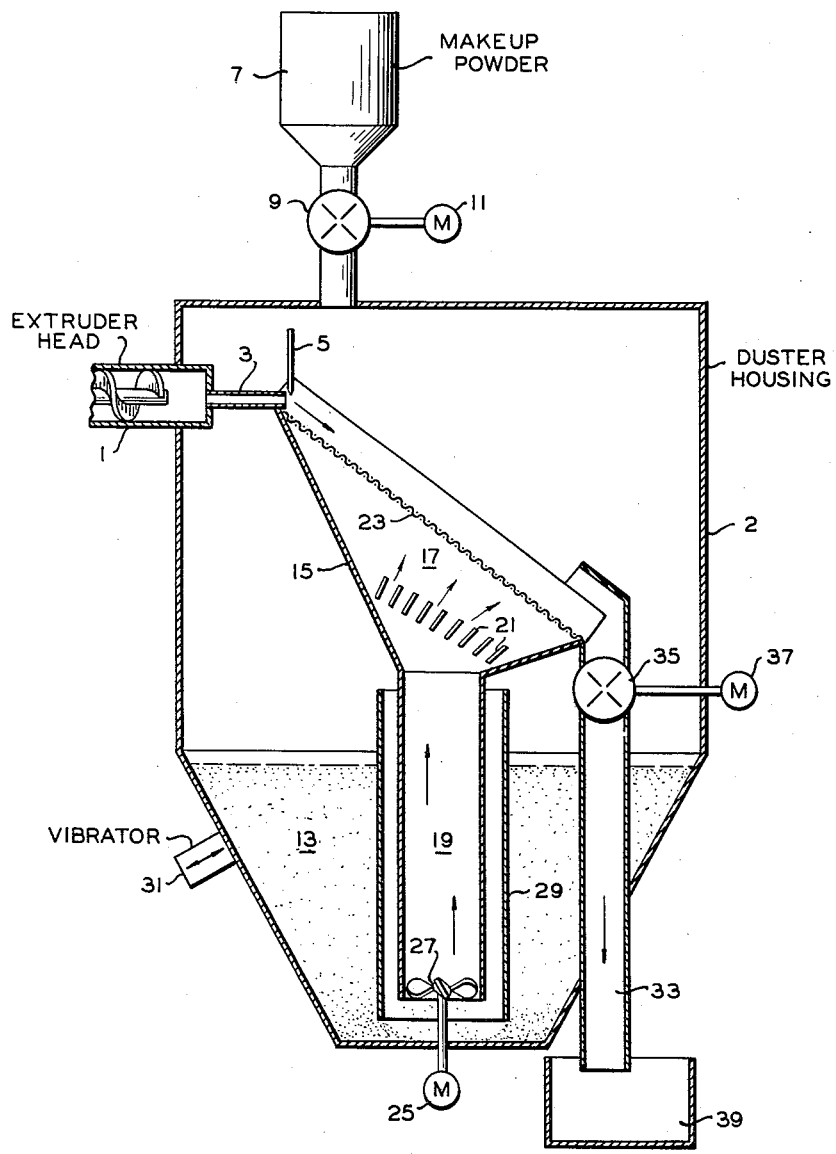

INVENTORS
E. E. KLEINMANN
P. F. TOOMAN
BY
*Hudson and Young*
ATTORNEYS

United States Patent Office 3,012,900
Patented Dec. 12, 1961

3,012,900
DUSTING PARTICLES OF ADHESIVE MATERIALS
Earl E. Kleinmann, Bartlesville, Okla., and Paul F. Tooman, Waco, Tex., assignors to Phillips Petroleum Company, a corporation of Delaware
Filed Apr. 26, 1957, Ser. No. 655,436
12 Claims. (Cl. 117—4)

This invention relates to process and apparatus for dusting particles or pellets of sticky or adhesive materials. In one aspect it relates to method and apparatus for reducing the sticking tendency of pellets of copolymers and other adhesive materials.

For use in commercial operations it is frequently desirable to obtain certain materials such as synthetic resins, asphalt, natural resins and the like in a finely subdivided or pelletized form. These materials exhibit adhesive properties and when subdivided great difficulty is encountered because of the tendency of the particles to adhere to each other and to the equipment in which they are processed.

It is therefore an object of this invention to provide an improved process and apparatus for obtaining nonadhesive particles of a normally adhesive material.

Another object of this invention is to provide improved process and apparatus for reducing the adhesive tendencies of particles of normally adhesive materials.

Still another object of this invention is to provide an improved method and apparatus for obtaining nonadhesive pellets of copolymer and other materials.

These and other objects of the invention will become more readily apparent from the following detailed description and discussion.

The aforedescribed objects are realized broadly by introducing particles or pellets of adhesive material to a confined zone, passing said particles downwardly through said zone and counter-currently contacting said particles with a gas containing a finely subdivided powder whereby the adhesive properties of the particles are substantially reduced. Thereafter the dusted particles are withdrawn from the confined zone as a product.

In one aspect of the invention a tumbling action is imparted to the adhesive particles or pellets as they pass downwardly through the confined zone.

In another aspect of the invention the particles or pellets of adhesive material pass downwardly through the confined zone along an inclined path and the ascending gases containing entrained powder are directed so that they are distributed uniformly along the path of the descending particles or pellets.

In still another aspect of the invention the powder is entrained in the ascending gases from a bed maintained in the lower portion of the confined zone and entrained powder which fails to contact and adhere to the particles or pellets of adhesive material returns to said bed.

As used herein the term "adhesive material" includes viscous, semi-solid, plastic materials, and the like, which when subdivided in their normal state tend to agglomerate on contact and tend to adhere to the surfaces of process equipment.

It is contemplated that the invention can be employed in the treatment of adhesive materials in general, including asphalts, natural and synthetic resins, plastics, and the like. The following description and discussion is directed to process and apparatus for the treatment of pellets obtained by cutting continuously extruded strands of copolymer, such as copolymer used in the preparation of propellants. This is not intended, however, in any limiting sense and as previously stated it is within the scope of the invention to treat other adhesive materials.

Typical of the copolymers which are used in propellants are the rubbery vinylpyridine copolymers which are obtained by copolymerizing one or more vinylpyridine compounds with one or more conjugated dienes. The vinylpyridine compounds employed can be represented by the formula

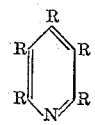

wherein R is selected from the group consisting of hydrogen, alkyl, vinyl, and alpha-methylvinyl (isopropenyl) groups, with at least one and not more than two of the groups being vinyl or alpha-methylvinyl, and the total number of carbon atoms in the alkyl groups being not greater than 12. The alkyl groups are preferably methyl and ethyl groups. Examples of such materials are; 2-vinylpyridine, 3-vinylpyridine, 4-vinylpyridine, 2-vinyl-5-ethylpyridine, 2,5-divinylpyridine, 2-methyl-5-vinylpyridine, 2,3,4-trimethyl-5-vinylpyridine, 3-ethyl-5-vinylpyridine, 2-methyl-5-isopropenylpyridine, 2,4-dimethyl-5-isopropenylpyridine, 3-ethyl-5-isopropenylpyridine, 2-isopropenylpyridine, and 2-vinyl-3,5-diamylpyridine, and 2-vinyl-4,6-dihexylpyridine.

The conjugated dienes employed in the production of vinylpyridine copolymers are preferably those containing from 4 to 6 carbon atoms per molecule, e.g., 1,3-butadiene, isoprene, piperylene, methylpentadiene, 2,3-dimethyl-1,3-butadiene and chloroprene. Conjugated dienes having more than 6, e.g., 8, carbon atoms per molecule can, however, be used when desired. Alkoxy derivatives, such as methoxybutadiene, ethoxybutadiene, etc., cyano derivatives of conjugated dienes, such as 2-cyanobutadiene, 2-methyl-3-cyanobutadiene, and the like can also be used.

In the preparation of vinylpyridine rubbers, the proportion of the various monomers can very over a wide range. For example, the conjugated diene can vary from 50 to 98 parts by weight and the vinylpyridine compound from 50 to 2 parts by weight. The ranges given are merely illustrative in nature and are not intended to include (over the entire range) all of the polymers which can be prepared by the use of various combinations of the monomers given.

The vinylpyridine copolymers are prepared according to methods well known in the art, for example, by mass or emulsion polymerization techniques utilizing suitable catalyst compositions. The polymers are then mixed with the desired additives and subjected to the usual milling or working treatments. The mass, thus obtained, is then subjected to molding and vulcanization as known in the art.

In general the polymerization process is carried out by forming an emulsion of the monomers in water with the aid of an emulsifying agent such as a fatty acid soap, a rosin acid soap, an alkyl aryl sulfonate, etc. Other ingredients include activators, initiators and modifiers. Preferably the system is maintained alkaline, that is, at a pH of about 9–12 and the polymerization takes place at a temperature between about −40° F. and about 150° F. A large variety of polymerization recipes can be used, typical of which are the potassium persulfate recipe, the sodium formaldehyde sulfoxylate recipe and the ferrous pyrophosphate recipe.

The mass polymerization process is carried out in a nonaqueous system in the presence of a diluent material. Suitable diluents include acyclic hydrocarbons, such as n-butane, n-pentane, etc., alicyclic hydrocarbons, such as cyclohexane and aromatic hydrocarbons, such as benzene. The catalyst employed is usually an alkali metal, such as sodium.

In carrying out the invention in one embodiment thereof, a vinylpyridine copolymer prepared by emulsion polymerization is extruded continuously from a conventional extruder and subdivided by a conventional chopping means such as a blade to form pellets of copolymer. The extrusion and pellet formation is carried out in a confined zone so that there is no loss of powder during the dusting operation. This is accomplished by extending and sealing the head of the extruder within the confined zone, and placing the cutting means also within said zone. Pellets leaving the extruder are passed downwardly along an inclined path during which they are contacted by an upwardly flowing gas containing the finely subdivided powder. During this process an even coating of powder is distributed on the surface of the pellets whereby their adhesive or sticking tendencies are substantially overcome. The coated or dusted pellets pass into a subdivided section of the confined zone in the lower portion thereof and are withdrawn as product from this section.

During their downward passage through the confined zone it is important that contact of the pellets with each other and any apparatus surfaces be held to a minimum until the dusting operation is substantially complete. It has been found that this can be effectively accomplished by providing as the pathway for the descending pellets, an inclined screen or perforated trough having an upper terminus disposed below the extruder head and a lower terminus disposed in comunication with the section wherein the dusted pellets accumulate for withdrawal from the confined zone. By suitably controlling the angle of inclination of the screen or perforated trough it is possible to obtain the desired dusting without adherence of the pellets to either each other or to the screen or trough. By the nature of their construction the screen and trough tend to impart a tumbling action to the pellets and the angle of inclination of the screen or trough can be varied to control the velocity with which the pellets travel downward and also the quantity of pellets moving across the screen at any one time. If desired, particularly when a perforated trough is used, portions of the trough can be raised to form a corrugated type of surface whereby the tumbling action imparted to the pellets is increased in magnitude. If desired a motion can be imparted to the screen or trough to aid in the dusting operation. Thus, for example, a vibrating screen can be employed.

The dusting operation can be carried out at substantially any temperature or pressure. The temperature conditions usually are those required for extrusion of the particular material to be dusted and the pressure normally is atmospheric; however, if desired pressures above or below atmospheric can also be employed.

Various types of powder can be used in the dusting operation. The powder can be either of an organic or inorganic nature and can include such materials as silica, magnesium oxide, clay, limestone, flour, soapstone, ammonium nitrate, etc. It is desirable that powder be in a very finely subdivided state for example, between about 60 and finer than 200 mesh and preferably finer than 200 mesh so that an appreciable quantity of the particles are in the range of 10–100 microns. Usually suitable materials will have a bulk density when settled of between about 25 and about 45 pounds per cubic foot. It is desirable that sufficient powder be entrained in the air to provide adequate dusting. However, the amount of powder provided should not be too great. Thus, for example, it is not desirable to carry out the invention where the quantity of powder and gas velocities employed are such as to provide a dense phase bed of powder around the inclined screen or trough. It is preferred that the process be carried out in such a manner that the powder is present in the form of a dispersed or dilute phase as these terms are conventionally used in the fluidized art. The solids content of the ascending gases can vary between about 0.01 and about 4 pounds per cubic foot and preferably between about 0.1 and about 1.0 pound per cubic foot. These concentrations are provided by passing the gases upwardly in the confined zone at velocities in the range of between about 0.3 and about 5 feet per second and preferably between about 1 and about 3 feet per second.

As previously stated, it is important that the dusting operation be carried out so that the pellets during dusting come in contact with each other and exposed apparatus surfaces a minimum number of times before the dusting operation is completed. It has been found desirable that the pellets passing downwardly are limited in number whereby at a maximum a single layer of pellets is present on the screen or perforated trough. Also it is important that a tumbling action be imparted to the pellets since this helps to overcome the sticking tendency of the pellets when in contact with the screen or trough and also serves to distribute powder more evenly over the pellets inasmuch as the dust coming in contact therewith is principally moving in an upward direction. It has also been found desirable, in order to prevent sticking of the pellets to the chopping blade, to impinge dust on said blade, such as by the use of high velocity dust laden gas streams.

In order to more fully describe the invention in its various embodiments and to provide a better understanding thereof reference is had to the accompanying drawings of which, FIGURE 1 is a diagrammatic illustration in cross-section of a closed vertical sealed vessel containing an inclined screen for receiving extruded pellets, a bed of finely subdivided powder, fan means for passing air upwardly from said bed in contact with the inclined screen and means for removing dusted pellets from said vessel.

Figure 3:
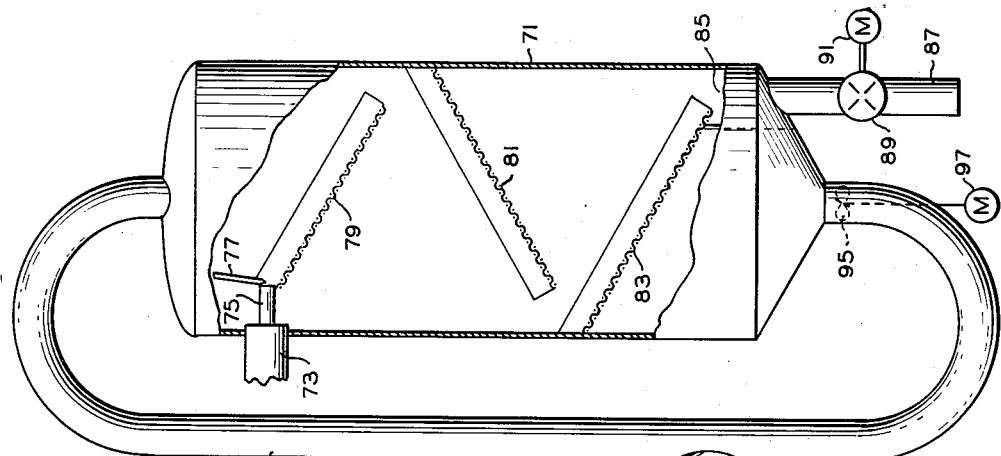
Figure 2:
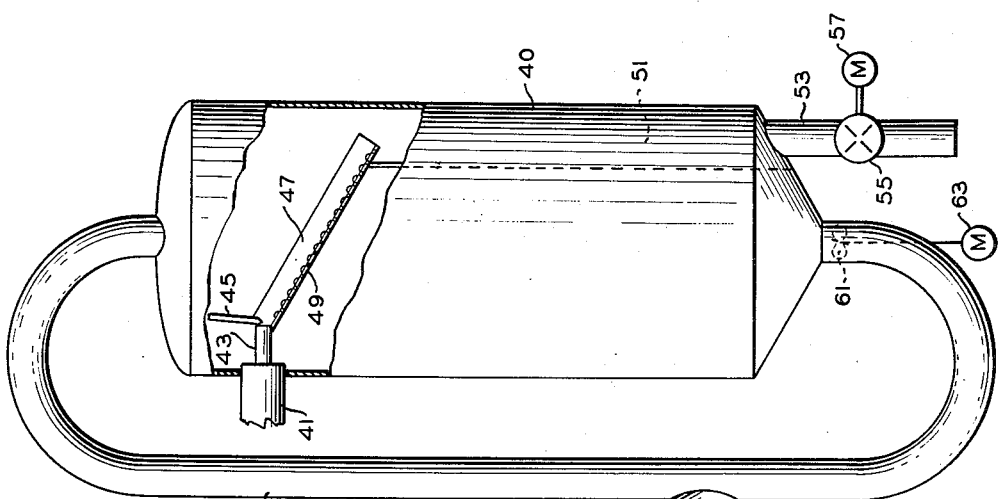

FIGURE 2 is a diagrammatical illustration in cross-section in a similar vessel containing an inclined corrugated perforated trough in place of the inclined screen of FIGURE 1 and means for circulating air containing a finely subdivided powder from the bottom of said vessel upwardly through and around said trough, said powder and air passing from the top of the vessel and returning downwardly externally of the vessel to the bottom of the vessel for recirculation therethrough, FIGURE 3 is a diagrammatic illustration in cross-section of apparatus similar to FIGURE 2 with the exception that the inclined trough is replaced by a series of inclined screens spaced in a downwardly direction, alternately attached to opposite walls of the vessel and sloping alternately in opposite directions whereby the downwardly descending pellets pass from screen to screen before being removed from said vessel.

Referring to FIGURE 1, a vinylpyridine polymer prepared by the emulsion polymerization of a pyridine, such as 2-methyl-5-vinylpyridine and a diene, such as 1,3-butadiene is coagulated, washed, subdivided, dried, and passed through a screw type extruder into extruder head 1 and emerging from the extruder head through conduit 3, the extruder head and conduit 3 being in open communication with and enclosed in vertically disposed dusting vessel 2. The extruded strand leaving conduit 3 is contacted periodically with chopping blade 5 whereby the strand is subdivided into pellets of copolymer. The chopped pellets fall downwardly from the blade onto screen 23 and pass across the screen through star valve 35 and into section 33, accumulating in storage bin 39. Screen 23 encloses the top portion of an enlarged section 15 which decreases in cross-section in a downward direction. At its lower terminus this section communicates with and is attached to cylindrical section 19 which is vertically disposed in vessel 2. The bottom of the cylindrical section is sealed by the blades of fan 27 which is driven by motor 25. Surrounding cylindrical section 19 is a bed 13 of finely subdivided powder, which is used in the dusting operation. Powder from bed 13 is passed upwardly by means of fan 27 through cylindrical section 19 and into expanded section 15. From there it is passed through zone 17 and screen 23 coming in contact with the descending copolymer pellets. A portion of the powder is retained on the pellets and the remaining powder after passing into the surrounding zone of lower gas velocity returns to bed 13 by settling. In order to facilitate operation of fan 27 a second cylindrical section 29 of larger cross-section is disposed around section 19 with its upper terminus extending above the top level of the bed of powder and its bottom terminus extending below the fan blades but not in contact with the bottom of the dusting vessel 2. The dusting operation is aided by providing vanes 21 in the lower portion of expanded section 15 whereby the powder-laden air leaving section 19 is evenly distributed across screen 23. Screen 23 is disposed at a suitable angle whereby a maximum of tumbling action is imparted to the descending pellets and the quantity of pellets on the screen does not exceed a maximum of a single layer. It is possible that bridging can occur in the dust bed therefore a vibrator 31 is provided to assure continuous passage of dust to the section of fan 27. As desired, makeup powder can be introduced to the dusting vessel from a hopper 7 through star valve 9 which is driven by motor 11.

The preceding apparatus represents a preferred embodiment of the invention, however, it is not intended that the invention be limited thereto but that other apparatus can also be used for carrying out the dusting operation. In another embodiment of the invention; illustrated by FIGURE 2, copolymer from extruder conduit 43 is pelletized and the pellets are passed downwardly over perforated trough 47. In this particular apparatus the desired tumbling action of the pellets is obtained by raising portions of the surface 49 of the trough to form a corrugated surface. Also in this embodiment of the invention the gases and entrained solids are passed through a continuous closed circuit said circuit being formed by a conduit which connects the top and bottom of dusting vessel 40, said conduit being disposed externally of said vessel. Movement of the gases is provided by fan 61 which is driven by motor 63.

In the operation of this embodiment of the invention gases containing entrained powder pass upwardly through dusting vessel 40 through and around trough 47 and thus in contact with descending copolymer pellets. The gases and any unused powder then exit from vessel 40 through conduit 59 and return to the bottom of this vessel. This type of apparatus and the operation thereof eliminates the problem of solids bridging in the dusting vessel since no level of solids is maintained therein. Any additional makeup solids which are required can be introduced to conduit 59 through star valve 67 and conduit 65. Product removal is effected from section 51 through conduit 53 and star valve 55.

In still another embodiment of the invention, as illustrated in FIGURE 3, the perforated corrugated trough of FIGURE 2 is replaced by a series of inclined screens 79, 81, and 83. The screens are spaced downwardly through dusting vessel 71 with alternate screens being inclined in opposite directions so that pellets leaving the extruder head pass in succession from screen to screen before entering product discharge zone 85. In this embodiment a continuous closed air powder circulating system again is employed, with makeup solids being introduced to the circulating conduit through a star valve 101 and conduit 99.

The preceeding embodiments have been presented as illustrative of the method and apparatus of this invention, however, it is not intended in any way that the scope of the invention should be limited thereby. Thus other, equivalent apparatus for carrying out the invention can be used, the principal requirement being that contact between the powder-laden gases and the extruded pellets be carried out according to the procedures and to give the results previously described.

The following example is presented in illustration of an application of a preferred embodiment of the invention.

Example

A copolymer of butadiene and 2-methyl-5-vinylpyridine is prepared by emulsion polymerization at 41° F. using a weight ratio of butadiene to 2-methyl-5-vinylpyridine of 90–10 to provide a copolymer having a Mooney (ML–4) of 150. The recipe for this copolymer is as follows:

| | Parts by weight |
|---|---|
| Water | 180 |
| Butadiene | 90 |
| 2 - methyl - 5 - vinylpyridine | 10 |
| Potassium OSR soap | 6.0 |
| KOH | 0.1 |
| KCl | 0.1 |
| Daxad 11 [1] | 0.2 |
| $K_4P_2O_7$ | 0.132 |
| $FeSO_4 \cdot 7H_2O$ | 0.111 |
| Cumene hydroperoxide | 0.067 |
| Sulfole | 0.51 |

[1] Sodium salt of condensed alkyl aryl sulfonic acid.

Following this the latex is coagulated with sodium chloride solution, washed with water, and subdivided into crumbs by being passed through a screen. The crumb is then dried and introduced to a screw type extruder from which it is extruded into a dusting apparatus similar to that disclosed in FIGURE 1. In the extrusion operation the extrusion rate is controlled to provide a pellet formation of about 80 pellets per minute having a diameter of about 1″ and a length of about 1″. The pellets are dusted on a vibrating screen inclined at an angle of about 30° and having a length to provide a dusting path of about 6 feet. Dusting is provided by contacting the pellets with finely subdivided ammonium nitrate entrained in air, said ammonium nitrate being passed upwardly through the inclined screen. A powder concentration of about 0.1 pound per cubic foot is provided by blowing air upwardly at a linear velocity of about 0.3 foot per second through the screen 23 of FIGURE 1. The dusted pellets leaving the screen are passed through a star valve and are withdrawn from the duster with a uniform coating of powder whereby the adhesive or sticking tendency of the pellets is substantially overcome.

Having thus described the invention by providing a specific example thereof, it is to be understood that no undue limitations or restrictions are to be drawn by reason thereof and that many variations and modifications are within the scope of the invention.

I claim:

1. A process for reducing the sticking tendency of an adhesive material which comprises introducing said material in extruded form into the upper portion of a confined zone containing finely subdivided powder entrained in a gas, subdividing said extrudate into particles, simultaneously passing a stream of said particles downwardly through said zone along an inclined path and mechanically imparting a tumbling action to said particles, passing a gas upwardly in said zone, entraining in said gas a finely subdivided powder, contacting descending particles of adhesive material with said entrained powder whereby said particles are coated with powder and the adhesive properties thereof are substantially reduced and withdrawing coated particles from the confined zone.

2. The process of claim 1 in which the velocity of the ascending gas is between about 0.3 and about 5.0 feet per second and the solids density in said gas is between about 0.01 and about 4.0 cubic feet per pound.

3. A process for reducing the sticking tendency of extruded pellets of an adhesive material which comprises introducing said material in extruded form into the upper portion of a confined zone containing finely subdivided powder entrained in a gas, subdividing said extrudate into particles, simultaneously passing a stream of particles downwardly through said zone in an inclined path and mechanically imparting to said particles a tumbling action, controlling the angle of inclination of the path of said pellets and the feed rate of said pellets to provide a pellet depth along said path not exceeding one pellet, passing a gas upwardly in said zone, entraining in said gas from a bed in the lower portion of said zone a finely subdivided powder, contacting the descending pellets of copolymer with powder laden gas distributed substantially uniformly along the path of the descending pellets whereby said pellets are coated with powder and the adhesive properties thereof are substantially reduced and withdrawing coated pellets from the confined zone.

4. Apparatus for dusting pellets of adhesive material which comprises in combination a confined vertical vessel, means for introducing said material into said vessel in extruding form, means disposed within said vessel for dividing the extruded material into pellets in an atmosphere containing entrained finely subdivided powder, inclined means disposed within said vessel adapted to receive said pellets and to mechanically impart to said pellets a downwardly tumbling motion, means for passing air upwardly in said vessel in contact with the downwardly moving pellets, means for entraining finely subdivided powder in said air whereby said powder is brought in contact with the moving pellets and means for removing powder coated pellets from said vessel.

5. The apparatus of claim 4 in which the inclined means is a wire screen.

6. The apparatus of claim 4 which inclined means is a perforated corrugated trough.

7. The apparatus of claim 4 which the inclined means comprises a series of screens spaced in a downward direction with said confined vertical vessel, said screens being alternately attached to the opposite walls of said vessel and sloping alternately in opposite directions whereby the pellets pass downwardly from screen to screen before being removed from said vessel.

8. Apparatus for dusting pellets of adhesive material which comprises in combination a confined vertical vessel adapted to contain a bed of powder in the lower portion thereof, means for introducing said material into said vessel in extruded form, means disposed within said vessel for dividing the extruded material into pellets in an atmosphere containing entrained finely subdivided powder, cylindrical conduit means open at each end vertically disposed in said vessel with the bottom terminus of said conduit means extending below the top level of the powder bed, a section of expanded cross section openly communicating with and superposed on said conduit means having a top opening inclined to the horizontal, a wire screen superposed on said expanded section with the top edge thereof disposed under said extruding means and the bottom edge thereof adapted to discharge pellets into a partitioned section within said vessel, fan means disposed within the bottom opening of the cylindrical conduit means adapted to propel a stream of air upwardly, means for introducing makeup powder to said vessel and means for withdrawing dusted pellets from said partitioned section.

9. The apparatus of claim 8 in which a second cylindrical conduit open at each end is disposed to form an annular space around the cylindrical conduit means with the upper terminus of said second conduit extending above the top level of the powder bed and the bottom terminus extending below the bottom terminus of the cylindrical conduit means but not in contact with the bottom of the vertical vessel and deflection means in the lower portion of the section of expanded cross section for distributing powder laden air substantially uniformly along the wire screen.

10. The apparatus of claim 9 in which vibrating means is provided to prevent bridging of powder solids in the powder bed.

11. The process of claim 3 wherein said adhesive material is a vinylpyridine-butadiene copolymer.

12. The process of claim 3 in which the velocity of the ascending gas is between about 0.3 and about 5.0 feet per second and the solids density of said gas is about 0.01 and 4.0 pounds per cubic foot.

References Cited in the file of this patent

UNITED STATES PATENTS

| Number | Name | Date |
|---|---|---|
| 1,952,556 | MacFarlane | Mar. 27, 1934 |
| 2,059,983 | Dent et al. | Nov. 3, 1936 |
| 2,093,995 | Blow | Sept. 28, 1937 |
| 2,143,479 | Esselen | Jan. 10, 1939 |
| 2,315,924 | Bertram | Apr. 6, 1943 |
| 2,319,859 | Hale | May 25, 1943 |
| 2,370,952 | Gordon | Mar. 6, 1945 |
| 2,399,717 | Arveson | May 7, 1946 |
| 2,422,480 | Gordon | June 17, 1947 |
| 2,539,916 | Ludington et al. | Jan. 30, 1951 |
| 2,543,898 | DeVaney | Mar. 6, 1951 |
| 2,560,767 | Huff | July 17, 1951 |
| 2,594,894 | Fehrenbach | Apr. 29, 1952 |
| 2,648,609 | Wurster | Aug. 11, 1953 |
| 2,653,350 | Piperoux | Sept. 29, 1953 |
| 2,676,562 | Dorfan | Apr. 27, 1954 |
| 2,729,597 | Garbo | Jan. 3, 1956 |
| 2,767,149 | Wendrow | Oct. 16, 1956 |
| 2,895,939 | Stober et al. | July 21, 1959 |

UNITED STATES PATENT OFFICE
CERTIFICATE OF CORRECTION

Patent No. 3,012,900                          December 12, 1961

Earl E. Kleinmann et al.

It is hereby certified that error appears in the above numbered patent requiring correction and that the said Letters Patent should read as corrected below.

Column 7, line 18, for "extruding" read -- extruded --.

Signed and sealed this 8th day of May 1962.

(SEAL)
Attest:

ERNEST W. SWIDER                        DAVID L. LADD
Attesting Officer                           Commissioner of Patents